J. A. CAREY & W. B. CHOATE.
Spout for Tea and Coffee Pots.
No. 214,551. Patented April 22, 1879.
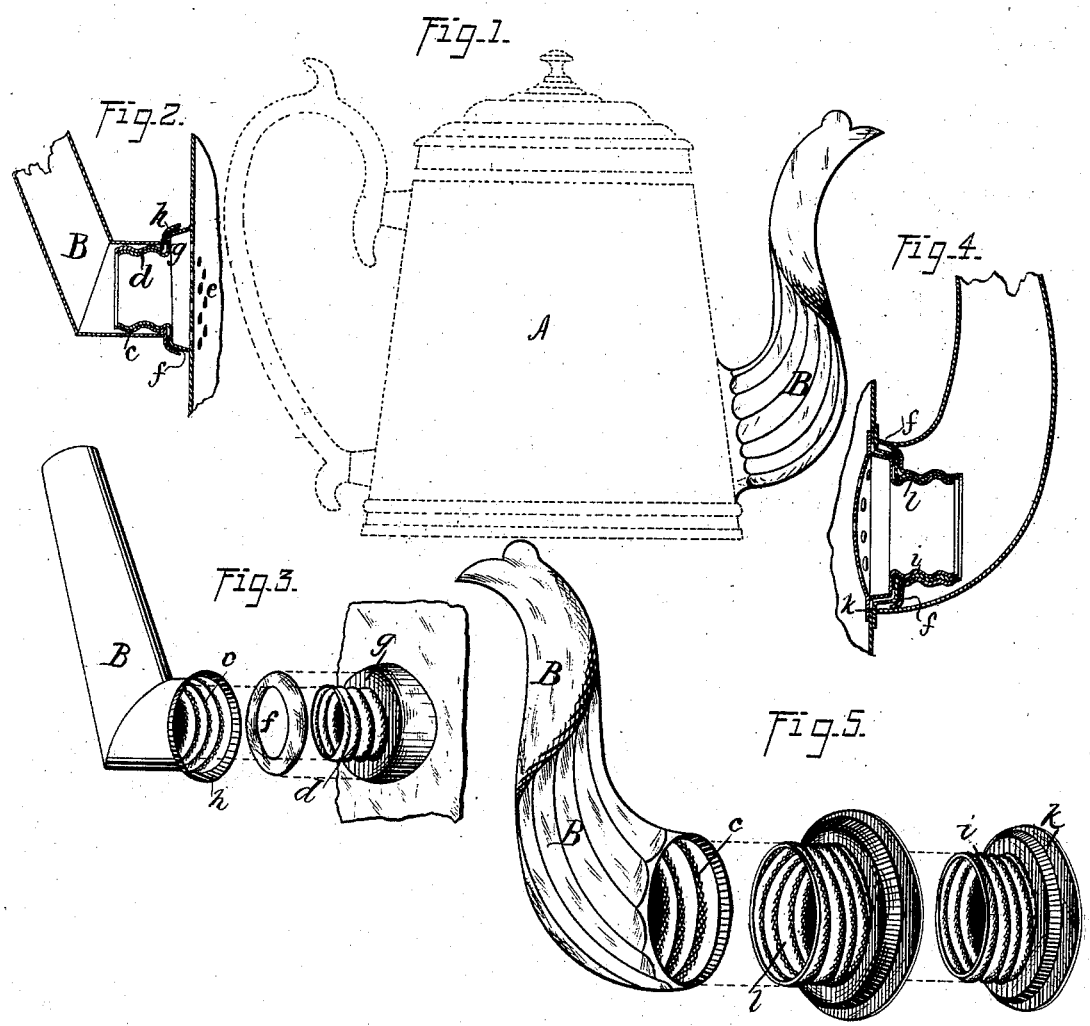

UNITED STATES PATENT OFFICE.

JAMES A. CAREY AND WILLIAM B. CHOATE, OF AURORA, ILLINOIS.

IMPROVEMENT IN SPOUTS FOR TEA AND COFFEE POTS.

Specification forming part of Letters Patent No. 214,551, dated April 22, 1879; application filed July 12, 1878.

*To all whom it may concern:*

Be it known that we, JAMES A. CAREY and WILLIAM B. CHOATE, both of Aurora, in the county of Kane and State of Illinois, have invented certain new and useful Improvements in Spouts for Tea and Coffee Pots, &c.; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention relates to a special construction of tea and coffee pots, whereby the spout may be readily attached to and detached from the pot, for the purpose of cleaning, or for the removal of any tea-leaves, coffee-grounds, sediment, dirt, &c., which will from time to time accumulate near the strainer or orifices at the junction of the spout with the side of the pot, such point of junction being usually near the bottom of the vessel. The spouts of these pots generally meet the side of the vessel at an acute angle near its bottom, where the leaves and sediment are apt to be the thickest, and strainers of some sort (or a number of small outlets) are usually made at that point where the liquid passes from the pot into such spout. In sheet-metal ware the lower end of the spout, at the line of its junction with the body of the vessel, usually forms a sort of pocket between itself and the exterior of the vessel, and in this pocket the finer dregs, which may have passed the strainer, fall back and collect, all not being able to pass back through the sieve or strainer. This sediment accumulates and hardens until oftentimes the spout becomes completely closed by it.

To avoid these and kindred and other defects, and at the same time to provide a spout which may be simply and readily substituted for an injured or broken one, is the object of our present invention, while at the same time that our detachable spout, when applied, may not present an appearance different from the customary permanent spouts.

Figure 1 represents a tea or coffee pot in dotted lines with our improved spout attached. Fig. 2 is a section of one form of the spout embodying our invention; Fig. 3, a perspective of the same with the parts detached. Fig. 4 is a section of another form; Fig. 5, a perspective of the parts in Fig. 4 detached.

A represents an ordinary coffee-pot, made of sheet metal and with our improved spout attached, from which it will be observed that nothing upon its exterior conveys or need convey even a suggestion that the entire spout is not permanently soldered to the body of the vessel in the usual way. B is the removable spout, having soldered or otherwise secured within its lower and larger end a screw-threaded thimble or ring, $c$, adapted for a threaded projection or nipple, $d$, which latter is secured directly to the wall, perimeter, or body of the pot by soldering or in any appropriate manner, such nipple having preferably a strainer, $e$, which may form part of itself, or which may be made by perforations in the sheet metal of the pot, as shown. $f$ is a flexible washer placed over the nipple $d$, and resting on a ledge, $g$, on its flaring base, and which may be used or not, as desired, and which, when the spout is screwed to its place, becomes compressed between the ledge $g$ and the flange $h$ of the spout.

This construction is simple, the joint is tight, the screw-threads are concealed by the spout, and the entire vessel with its spout applied is in no wise different in appearance from one with a permanent spout.

It will now be seen that when for any reason it is desirable to remove the spout, it is only necessary to unscrew it, and then both sides of the strainer may be cleansed, as also the parts adjacent, and likewise the spout.

The threaded part $c$ of the spout may be cast or made within the spout, dependent on the material of which the vessel and spout are made; or it may be made in a separate piece and soldered to and within the spout, as shown.

In case the vessel is made of a material that will not admit of soldering, (such as earthen or granite ware,) a threaded nipple, $i$, having a flange, $k$, may be passed through the vessel from the inside, as shown in Fig. 4, its nipple projecting outside and its flange resting against the inner side of the vessel. A second threaded nipple, $l$, is then applied outside the vessel by screwing it directly to the projecting part of said first nipple, the two being then screwed tightly to each other and to the body of the vessel, which is thus located between the flanges of these two nipples. This screwing makes the whole secure and rigid, as if soldered on. The spout is then screwed onto the exterior one of these two nipples, the interior one having a strainer attached to it. The spout may be detached, as heretofore set forth, without disturbing either of the threaded nipples, as the latter are secured to the vessel and to each other independently of the attaching or removing of the spout therefrom. That part of the spout which is screwed to the side of the vessel may be put on at right angles to such side, as shown in Fig. 4, and the remainder of the spout turned upward therefrom.

It will be evident that our invention can be applied to other vessels having spouts, or spouts and strainers, which it is desired to cleanse from time to time.

We claim—

1. A spout for a tea-pot, coffee-pot, or similar article, composed of a short nipple secured to the body of the vessel, and having an exterior screw-thread thereon, and a removable spout provided with an interior screw-thread at its base, invisible from its exterior, and adapted for connection with a threaded nipple, the spout, when applied to the nipple, reaching to or substantially to the body of the vessel, all as and for the purposes shown and described.

2. The combination of the screw-threaded short nipple $i\ k$, the auxiliary threaded nipple $l$, and the interiorly-threaded spout $c$, substantially as shown, and for the purpose described.

JAMES A. CAREY.
WILLIAM B. CHOATE.

Witnesses:
A. E. SEARLES,
J. T. H. KENDALL.